UNITED STATES PATENT OFFICE.

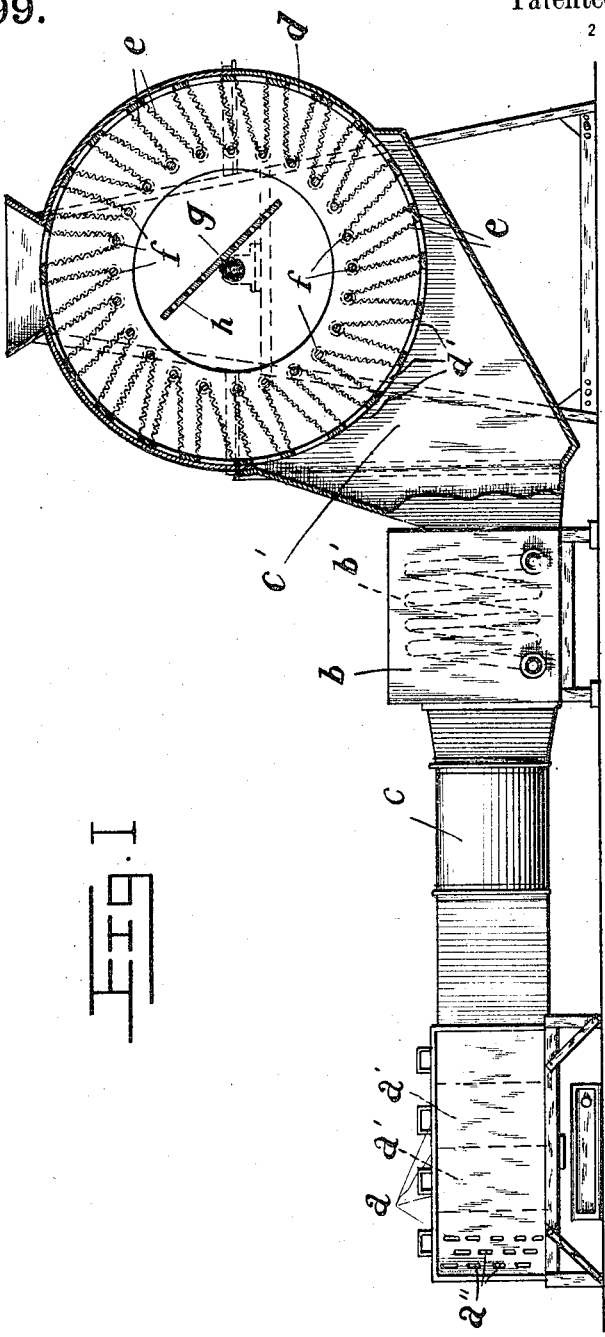

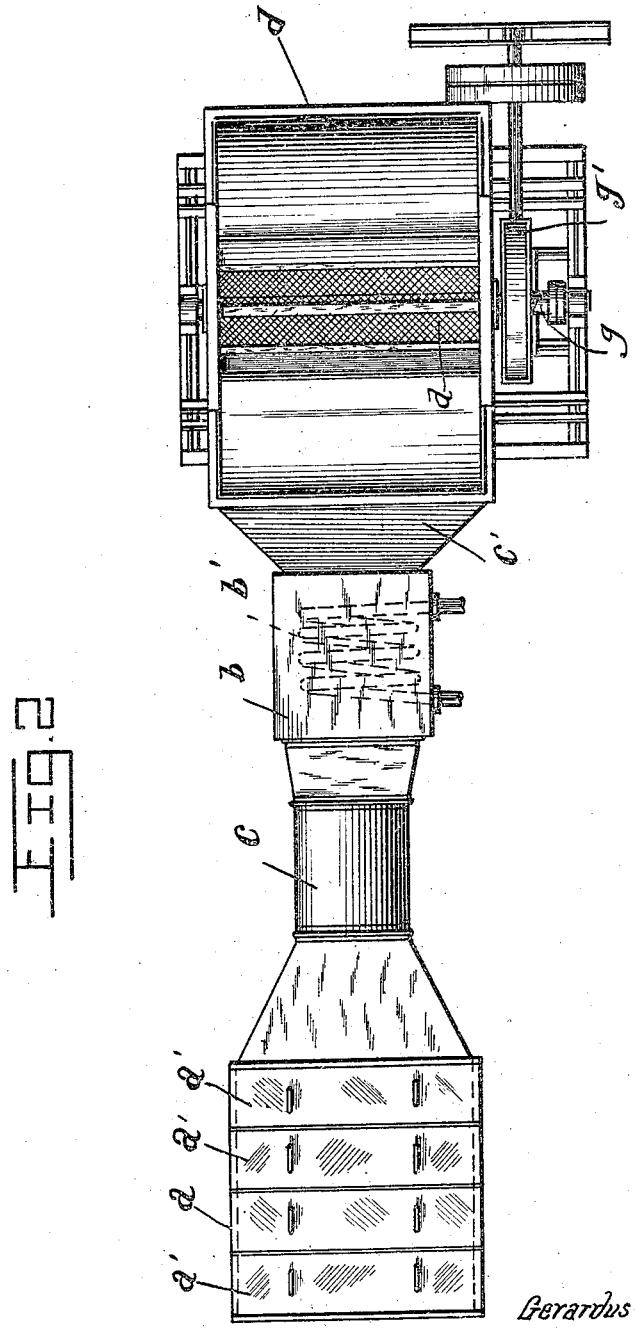

GERARDUS HENDRIKUS STROBAND AND JOHANES HENRICUS STROBAND, OF AMSTERDAM, NETHERLANDS.

DRYING APPARATUS.

1,241,299.

Specification of Letters Patent.

Patented Sept. 25, 1917.

Application filed April 5, 1916. Serial No. 89,237.

*To all whom it may concern:*

Be it known that we, GERARDUS HENDRIKUS STROBAND and JOHANES HENRICUS STROBAND, manufacturers, citizens of Amsterdam, subjects of the Queen of the Netherlands, and residing at Prinseneiland 99, in the city of Amsterdam and the Kingdom of the Netherlands, have invented certain new and useful Improvements in a Drying Apparatus, of which the following is a full, clear, and exact description.

This invention relates to known processes for drying any kind of material contained in a rotating or oscillating cylinder and exposed to the action of air previously dried for instance by having the same caused to pass over a moisture absorbing substance, such as calcium chlorid, the air serving for drying, may after being subjected to the action of moisture absorbing substances, further be subjected to action of heat, according to the condition and nature of the material to be dried.

According to the present invention the previously dried air enters the rotating cylinder in a continuous stream by passages at the lower part of its periphery and after traversing the material to be dried escapes at the upper part of the periphery of the cylinder.

The air at its entrance into the cylinder passes into perforated pockets placed with their bases toward the inner periphery of the cylinder, the material to be dried fills the spaces between the pockets and consequently as the air is drawn toward the opened or inner ends of the pockets and directed toward the center of the cylinder, it passes in an upward path through thicker masses of the substance to be dried.

Apparatus suitable for the process is illustrated by way of example in the accompanying drawing, in which Figure 1 is an elevation of the installation, and Fig. 2 is a plan partly in section.

Referring now more particularly to the accompanying drawings wherein like and corresponding parts are designated by similar reference characters throughout the several views, A device for the primary drying of the air by means of a moisture absorbing substance, such as calcium chlorid, is indicated as at $a$, which comprises a receptacle having a plurality of removable compartments $a'$ in which calcium chlorid is retained. The receptacle is also provided with the inlet openings at the sides thereof indicated by $a''$, wherein the atmospheric air may enter the chamber $a$ and circulate around and through the calcium chlorid contained therein in any well known or preferred manner. The air after passing through the moisture absorbing substance within the receptacle $a$ enters the primary heating chamber $b$ by means of the passageway $c$. This heating chamber may have arranged therein the coils $b'$ for heating the air and a description of its detailed construction is thought unnecessary as such are well known and common within the art. The air in leaving the heating chamber passes through the casing $c'$ into the revolving cylinder $d$. This cylinder $d$ is rotatably mounted upon the shaft $g$ and the latter is secured within a casing which incloses the cylinder $d$ and the cylinder $d$ is operatively connected to a driving means $g'$ where it may be rotated continuously or oscillated intermittently as desired. The periphery of this cylinder $d$ is provided with a plurality of openings $d'$ and extending over these openings and projecting within the interior of the cylinder $d$ are the members $e$ forming a plurality of spaced pockets which are made preferably of wire gauze or webbing, but, of course, they may be made of any other suitable material which would assist in the removal of moisture from the material contained within the cylinder. Arranged within the cylinder are the transversely extending rods $f$ over which the inner ends of the members $e$ extend. These pockets are arranged at an angle to the radii of the cylinder $d$ so that when the cylinder $d$ is rotated a suction takes place within the cylinder, thereby drawing the air from the primary moisture absorbing and heating apparatuses. Secured to the shaft $g$ is a stationary perforated inclined plate $h$ upon which are adapted to drop the particles to be dried which are contained within the cylinder. As the cylinder $d$ rotates the particles contained therein to be dried drop by gravity upon the plate $h$ from the upper portion of the cylinder and then fall into the spaces between the pockets and in this manner the particles are thoroughly separated so that they will become thoroughly dried.

The operation is as follows:

After the cylinder has been completely or partially filled with material to be dried, it is set in motion; at the same time air is admitted to the drying device $a$ and subjected to the drying action of the moisture absorbing substances contained within the device $a$; the air thus dried is then heated by the heating device $b$ to the degree desired and subsequently the air is drawn to the rotary cylinder $d$ where the air passes through the openings $d'$, then through the wire gauze members $e$, subsequently passing through the material contained within the cylinder and finally escaping through the openings at the upper periphery of the cylinder to the atmosphere. The device is suitable for drying any materials, for example, grain, fruits or other agricultural products, provisions and chemicals of all kinds.

Having thus fully described our invention, what we claim as new and desire to secure by Letters Patent is:

1. A drying apparatus of the character described the combination of a primary moisture absorbing and air heating apparatus, of a revolving cylinder having a plurality of openings formed in the periphery thereof, a plurality of wire gauze members extending inwardly within said cylinder and extending over said openings, an angularly arranged plate arranged within said cylinder, and means for rotating said cylinder substantially as and for the purpose specified.

2. In a drying apparatus of the character described the combination of a primary moisture absorbing and air heating apparatus, of a rotatable cylinder having a plurality of openings in the periphery thereof, a plurality of perforated pockets extending inwardly within said cylinder and out of direct line of the radii of said cylinder, a shaft for supporting said cylinder, an angularly arranged plate supported upon said shaft whereby upon the rotation of said cylinder air will be drawn from said primary heating and absorbing apparatuses and subsequently caused to pass through said cylinder substantially as and for the purpose specified.

In witness whereof, we subscribe our signatures in presence of two witnesses.

GERARDUS HENDRIKUS STROBAND.
JOHANES HENRICUS STROBAND.

Witnesses:
T. W. HULSHOFF,
R. N. MARQUARD.

Copies of this patent may be obtained for five cents each, by addressing the "Commissioner of Patents, Washington, D. C."